United States Patent [19]

Engström et al.

[11] Patent Number: 4,900,516

[45] Date of Patent: * Feb. 13, 1990

[54] FLUIDIZED BED REACTOR

[75] Inventors: Folke Engström, Nagu; Seppo Ruottu, Karhula, both of Finland

[73] Assignee: A. Ahlstrom Corporation, Karhula, Finland

[*] Notice: The portion of the term of this patent subsequent to Oct. 13, 2004 has been disclaimed.

[21] Appl. No.: 907,857

[22] Filed: Sep. 15, 1986

Related U.S. Application Data

[63] Continuation-in-part of Ser. No. 773,756, May 14, 1985, Pat. No. 4,664,887.

[51] Int. Cl.$^4$ ................................................ B01J 8/24
[52] U.S. Cl. ...................................... 422/147; 55/345; 110/216; 110/245
[58] Field of Search ............... 422/144, 145, 147, 146; 110/245, 216; 55/345

[56] References Cited

U.S. PATENT DOCUMENTS

| | | | |
|---|---|---|---|
| 2,101,249 | 12/1937 | Frisch. | |
| 2,901,420 | 8/1959 | Evans. | |
| 3,100,693 | 8/1963 | Klein et al. | 422/147 |
| 4,311,670 | 1/1982 | Niemmen et al. | 422/147 |
| 4,313,910 | 2/1982 | Dries et al. | |
| 4,664,887 | 5/1987 | Engstrom | 422/147 |
| 4,699,068 | 10/1987 | Engstrom | 110/216 |
| 4,708,092 | 11/1987 | Engstrom | 122/40 |

FOREIGN PATENT DOCUMENTS

| | | | |
|---|---|---|---|
| 2159726 | 12/1985 | United Kingdom | 422/147 |
| 85-4117 | 9/1985 | World Int. Prop. O. | |

*Primary Examiner*—Michael S. Marcus
*Attorney, Agent, or Firm*—Nixon & Vanderhye

[57] ABSTRACT

A circulating fluidized bed reactor having a reactor chamber for containing fluidizing gas having entrained therein particulate material; a horizontal cyclone having a circumferential wall defining a separator chamber operatively connected at the reactor chamber for separating the material from the gas; a return pipe connected at the separator chamber of the cyclone at the circumference thereof for returning the separated material from the separator chamber to the reactor; and means for discharging the purified gas located in at least one end of the separator chamber of the cyclone. Preferably the separator chamber is located above the reactor chamber and the return pipe is connected at the lowermost point of the circumference of the separator chamber. The reactor is useful as combustor, gasifier and for the carrying out of chemical process.

19 Claims, 1 Drawing Sheet

FLUIDIZED BED REACTOR

The present application is a division of Ser. No. 733,756 filed May 14, 1985, now U.S. Pat. No. 4,664,887.

TECHNICAL FIELD

The present invention relates to a circulating fluidized bed reactor. In particular, the invention relates to an apparatus for separating solid material from the flue gases of the reactor and for recycling the solids to the reactor.

BACKGROUND ART

Circulating or dynamic fluidized bed reactors in which large amounts of solid particles are entrained by the gases flowing through the reactor chamber, are separated from the gases, and are thereafter recycled to the reactor, have long been used for various chemical processes and have recently also been employed as combustors and gasifiers. In heretofore known applications the separation of solids is carried out in a vertical cyclone separator having a hopper-shaped bottom. In these cyclone separators the cylindrical vortex chamber is connected to a gas discharge pipe for guiding the gases upwards whereas the solids are recycled from the vortex chamber to the reactor through a stand pipe via a gas lock. The gas lock prevents the reactor gases from flowing back into the cyclone through the stand pipe. Most commonly, a mechanical gas lock is employed. In more advanced designs a fluidized bed of solid particles in a U-shaped pipe is utilized as a gas lock. The solids recycling system, however, is complex and expensive, particularly in high temperature reactors. In addition, part of the air required for fluidizing the gas lock flows upwards in the stand pipe thereby detrimentally affecting the separation of solids, in particular the separation of light and fine particles. Furthermore, the rising gas flow decreases the transport capacity of the stand pipe.

In the center of a conventional cyclone, a substantial underpressure and a high axial flow velocity are created causing a suction effect on the stand pipe. The suction flow usually has no tangential velocity so that almost all of the solid material of the flow is transported out through the center pipe of cyclone. A recycling system provided with a conventional cyclone is therefore extremely sensitive to the suction flow from the stand pipe and accordingly requires a reliable gas lock.

In steam boiler applications, the use of a conventional cyclone results in a disadvantageous design since a conventional cyclone divides the boiler into a combustion chamber and a separate convection part following the cyclone, the equipment for recycling the solids being disposed therebetween.

In addition, mechanical gas locks have a relatively short life span and, particularly under hot conditions, are frequently subject to malfunction.

It is also known to locate a conventional cyclone including the entire solids recycling system inside the reactor space. This arrangement has, however, severe disadvantages, such as corrosion and erosion of the cyclone, since cooling of the supporting structure is difficult to achieve. Furthermore, as in conventional cyclones, the system is sensitive to the suction flow from the stand pipe.

It is accordingly an object of the present invention to overcome the drawbacks of conventional cyclone separators.

SUMMARY OF THE INVENTION

According to the present invention, a circulating fluidized bed reactor includes a reactor chamber for containing fluidizing gas having particulate matter entrained therein, a horizontal cyclone having a circumferential wall defining a separator chamber operatively connected at the reactor chamber for separating the material from the gas, a return pipe connected at the separator chamber of the cyclone at the circumference thereof for returning the separated material from the separator chamber to the reactor, and means for discharging the purified gas located in at least one end of the separator chamber of the cyclone. Preferably, the separator chamber is located above the reactor chamber and the return pipe is connected at the lowermost point of the circumference of the separator chamber.

BRIEF DESCRIPTION OF THE DRAWINGS

The invention is more specifically described below with reference to the accompanying drawings, in which.

DESCRIPTION OF THE PRESENTLY PREFERRED EMBODIMENTS

Figures 1, 2:
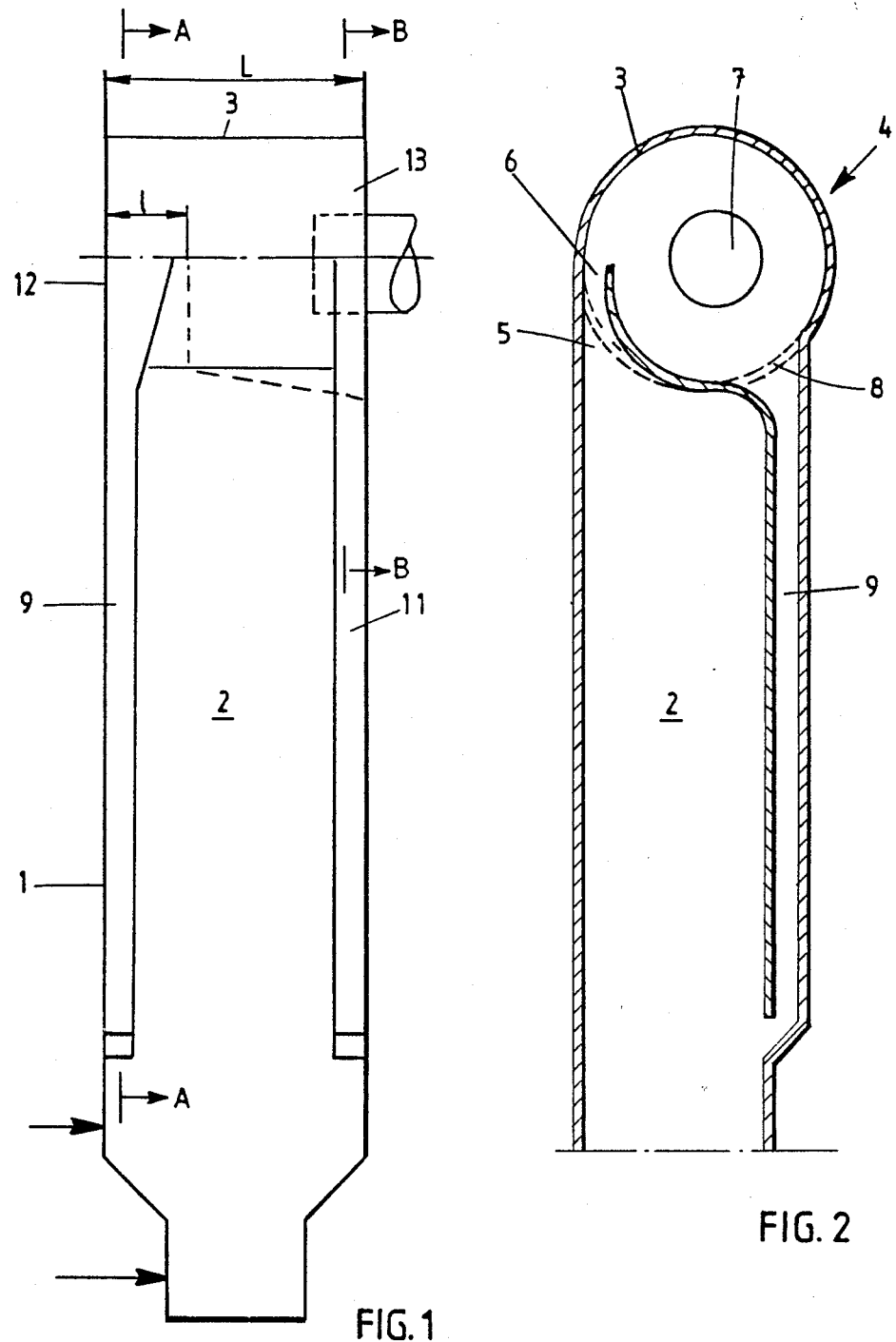
FIG. 1 is a vertical cross-sectional view of a preferred embodiment of the invention.
FIG. 2 is a side view of the apparatus of FIG. 1.

In the figures, reference numeral 1 refers to a vertical reactor chamber of a dynamic or circulating fluidized bed reactor from the upper end of which the discharged flue gases flow through a gas inlet duct 3 into a horizontally disposed separator chamber 4 of a cyclone particle separator 2 located above the reactor chamber and operatively connected therewith. Preferably, the separator chamber of the horizontal cyclone has a substantially cylindrical circumference. The inlet duct is formed by reactor walls 5 and 6, one of which is bent toward the other to form roof 7 of the reactor chamber. Inlet duct 3 is preferably connected at the circumference of the separator chamber to permit the particulate material entrained in the gas to tangentially enter the separator. The solid material is discharged at the periphery of the separator chamber and is recycled to the reactor chamber through one or more return pipes 8 which are preferably connected at the lowermost point of the circumference of the separator chamber. The purified gases are passed to a convection part 9, having heat transfer surfaces, through a discharge means 10 such as a gas outlet or a discharge pipe located at the end 11 of the separator chamber 4.

Fluidizing gas is supplied to the reactor through inlet 12 of air chamber 13 placed in the bottom part of the reactor. The gas is passed to the reactor chamber through a distributor plate 14 disposed between air chamber 13 and reactor chamber 4. The material separated in the horizontal cyclone separator 2 is conveyed through pipe or pipes 8 to the lower portion of the reactor chamber. Fuel such, for instance, as coal is introduced into the lower portion of the reactor chamber through a duct 15.

The flow technology of the inventive system differs from conventional arrangements in that, for example, solid material is recycled to the reactor through its being carried by a small gas flow. Good separation is achieved as the solids are discharged at the periphery of the separator chamber where the velocity of the solids is the highest.

The invention provides structural advantages such as a compact and simple structure, the avoidance of expansion joints, and the ability to pressurize the reactor without substantial extra costs.

The solids or the particulate material may be discharged from the separator chamber through a single opening extending over the whole length of the separator chamber and through one return pipe connected to that opening, or may be discharged through more than one opening and one or more than one return pipe.

The return pipe(s) may be provided with a water cooled wall if cooling of the material to be recycled to the reactor is desired. The walls of the reactor and the separator chamber may also be cooled.

The return pipes may also be provided with valves which may be selectively opened or closed. The location of the connection of the return pipe with the reactor may be positioned at different heights, thus permitting the solids to be guided to a desired point. The return pipes may also be arranged to run along the inside of the reactor chamber.

Finally, it should be understood that the preferred embodiment herein described is for illustrative purposes only and is not to be construed as limiting the scope of the invention, which is properly delineated in the appended claims.

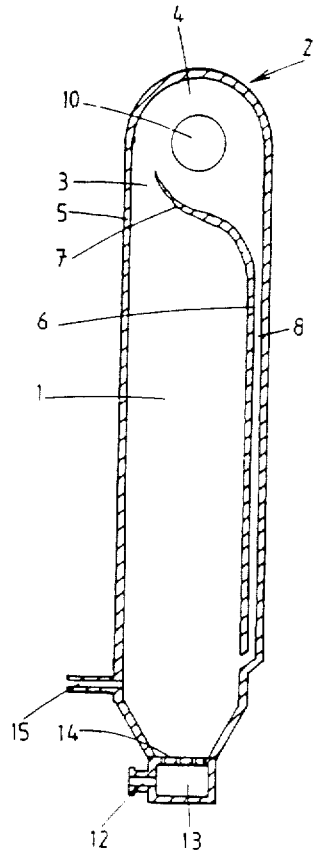

What is claimed is:

1. A circulating fluidized bed reactor comprising:
   (a) a reactor chamber for containing fluidizing gas having entrained particulate material therein;
   (b) a horizontal cyclone having a circumferential wall defining a separator chamber operatively connected at said reactor chamber for separating said material from said gas;
   (c) a return pipe connected to said separator chamber of said cyclone at the circumference of said chamber for returning said separated material from said separator chamber to said reactor; and
   (d) means for discharging the purified gas located in at least one end of said separator chamber of said cyclone.

2. The reactor of claim 1, wherein said return pipe is connected at the lowermost point of said circumference of said separator chamber.

3. The reactor of claim 2, wherein said separator chamber is located above said reactor chamber.

4. The reactor of claim 1, wherein said discharge means is a discharge outlet.

5. The reactor of claim 1, wherein said discharge means is a discharge pipe.

6. The reactor of claim 1, further comprising one or more additional return pipes connected at said separator chamber circumference.

7. The reactor of claim 2, further comprising one or more additional return pipes connected at said separator chamber circumference.

8. The reactor of claim 3, further comprising at least one additional return pipes connected at said separator chamber circumference.

9. The reactor of claim 1, further comprising cooling means for said reactor chamber and said horizontal separator.

10. The reactor of claim 1, further comprising cooling means for said return pipe.

11. In a circulating fluidized bed reactor of the type having a reactor chamber and a particle separator for the purification of gas, the improvement comprising:
    (a) a horizontal cyclone having a circumferential wall defining a separator chamber operatively connected to said reactor chamber;
    (b) a return pipe connected to said circumference wall of said separator chamber of said cyclone; and
    (c) means for removing the purified gas, said means being located in at least one end of said cyclone separator chamber.

12. The reactor of claim 11, wherein said return pipe is connected at the lowermost point of said separator chamber circumference.

13. The reactor of claim 12, wherein said separator chamber is located above said reactor chamber.

14. The reactor of claim 11, wherein said discharge means is a discharge outlet.

15. The reactor of claim 11, wherein said discharge means is a discharge pipe.

16. The reactor of claim 11, wherein said discharge means is located in one of said ends.

17. The reactor of claim 11, wherein said discharge means is located in both of said ends.

18. The reactor of claim 11, further comprising cooling means for said reactor chamber and said horizontal separator.

19. The reactor of claim 11, further comprising cooling means for said return pipe.

* * * * *

UNITED STATES PATENT AND TRADEMARK OFFICE
CERTIFICATE OF CORRECTION

PATENT NO. : 4,900,516

DATED : February 13, 1990

INVENTOR(S) : ENGSTROM et al.

It is certified that error appears in the above-identified patent and that said Letters Patent is hereby corrected as shown below:

Figures 1 and 2 of the patent should be replaced by the attached Figures 1 and 2.

The title page should be deleted to appear as per attached title page.

Signed and Sealed this

Fifteenth Day of October, 1991

Attest:

HARRY F. MANBECK, JR.

Attesting Officer

Commissioner of Patents and Trademarks

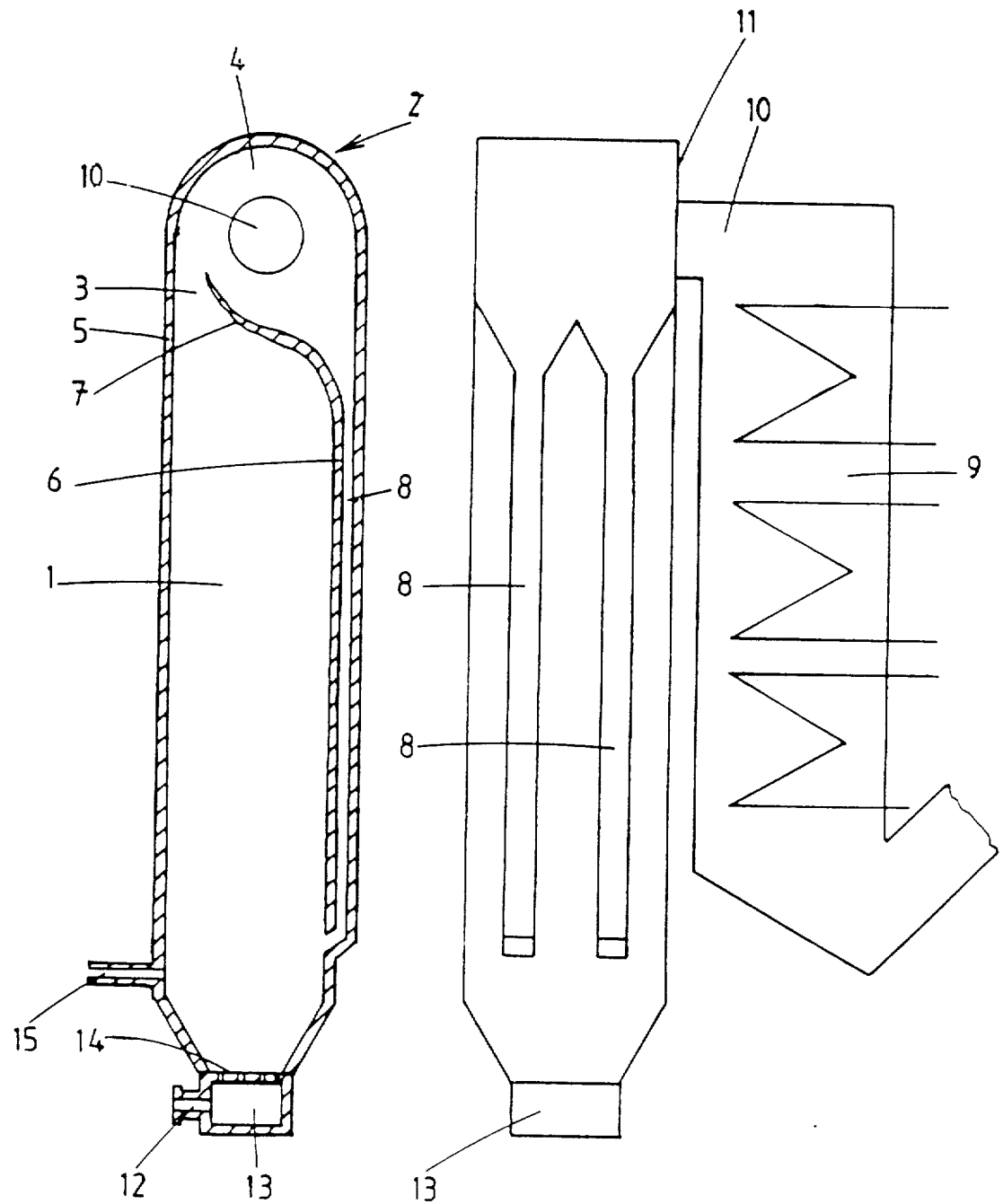

United States Patent [19]

Engström et al.

[11] Patent Number: 4,900,516

[45] Date of Patent: * Feb. 13, 1990

[54] FLUIDIZED BED REACTOR

[75] Inventors: Folke Engström, Nagu; Seppo Ruottu, Karhula, both of Finland

[73] Assignee: A. Ahlstrom Corporation, Karhula, Finland

[*] Notice: The portion of the term of this patent subsequent to Oct. 13, 2004 has been disclaimed.

[21] Appl. No.: 907,857

[22] Filed: Sep. 15, 1986

Related U.S. Application Data

[63] Continuation-in-part of Ser. No. 773,756, May 14, 1985, Pat. No. 4,664,887.

[51] Int. Cl.$^4$ ................................................ B01J 8/24
[52] U.S. Cl. ................................ 422/147; 55/345; 110/216; 110/245
[58] Field of Search ............... 422/144, 145, 147, 146; 110/245, 216; 55/345

[56] References Cited

U.S. PATENT DOCUMENTS

| | | | |
|---|---|---|---|
| 2,101,249 | 12/1937 | Frisch . | |
| 2,901,420 | 8/1959 | Evans . | |
| 3,100,693 | 8/1963 | Klein et al. | 422/147 |
| 4,311,670 | 1/1982 | Niemmen et al. | 422/147 |
| 4,313,910 | 2/1982 | Dries et al. . | |
| 4,664,887 | 5/1987 | Engstrom | 422/147 |
| 4,699,068 | 10/1987 | Engstrom | 110/216 |
| 4,708,092 | 11/1987 | Engstrom | 122/40 |

FOREIGN PATENT DOCUMENTS

| | | | |
|---|---|---|---|
| 2159726 | 12/1985 | United Kingdom | 422/147 |
| 85-4117 | 9/1985 | World Int. Prop. O. . | |

Primary Examiner—Michael S. Marcus
Attorney, Agent, or Firm—Nixon & Vanderhye

[57] ABSTRACT

A circulating fluidized bed reactor having a reactor chamber for containing fluidizing gas having entrained therein particulate material; a horizontal cyclone having a circumferential wall defining a separator chamber operatively connected at the reactor chamber for separating the material from the gas; a return pipe connected at the separator chamber of the cyclone at the circumference thereof for returning the separated material from the separator chamber to the reactor; and means for discharging the purified gas located in at least one end of the separator chamber of the cyclone. Preferably the separator chamber is located above the reactor chamber and the return pipe is connected at the lowermost point of the circumference of the separator chamber. The reactor is useful as combustor, gasifier and for the carrying out of chemical process.

19 Claims, 1 Drawing Sheet